(12) United States Patent
Rommel

(10) Patent No.: US 9,524,416 B1
(45) Date of Patent: Dec. 20, 2016

(54) FINGERPRINT SENSING DEVICE COMPRISING THREE-DIMENSIONAL PATTERN

(71) Applicant: Fingerprint Cards AB, Göteborg (SE)

(72) Inventor: Sonja Rommel, Göteborg (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/045,379

(22) Filed: Feb. 17, 2016

(51) Int. Cl.
*G06K 9/00* (2006.01)

(52) U.S. Cl.
CPC .......... *G06K 9/0002* (2013.01); *G06K 9/00053* (2013.01); *G06K 9/00087* (2013.01)

(58) Field of Classification Search
CPC ............. G06K 9/00053; G06K 9/0002; G06K 9/00013
USPC ........................................................ 382/124
See application file for complete search history.

(56) References Cited

U.S. PATENT DOCUMENTS

| | | | | |
|---|---|---|---|---|
| 4,353,056 A * | 10/1982 | Tsikos | ................ | A61B 5/1172 361/283.1 |
| 6,411,726 B1 * | 6/2002 | Pires | ................ | G06K 9/00053 313/506 |
| 8,175,344 B2 * | 5/2012 | Funahashi | ......... | G06K 9/00114 382/124 |
| 2007/0222010 A1 * | 9/2007 | Chou | ................ | G06K 9/00053 257/415 |
| 2012/0170819 A1 * | 7/2012 | Kiyomoto | ......... | G06K 9/00053 382/124 |
| 2015/0078634 A1 * | 3/2015 | Mankowski | ....... | G06K 9/00912 382/124 |
| 2015/0078635 A1 * | 3/2015 | Mankowski | ....... | G06K 9/00033 382/124 |
| 2015/0332080 A1 * | 11/2015 | Du | ................ | G06K 9/00033 382/124 |
| 2015/0347887 A1 * | 12/2015 | Vosoogh-Grayli | ....... | G06K 19/06037 235/454 |
| 2016/0086044 A1 * | 3/2016 | Yu | ................ | G06K 9/209 250/208.1 |

OTHER PUBLICATIONS

Gu, Y. et al., "Nanoscale—Color Generation Via Subwavelength Plasmonic Nanostructures," The Royal Society of Chemistry 2015, vol. 7, Mar. 16, 2015, pp. 6409-6419.

(Continued)

*Primary Examiner* — John Strege
(74) *Attorney, Agent, or Firm* — Remarck Law Group PLC

(57) ABSTRACT

There is provided a fingerprint sensing device comprising: a sensing chip comprising an array of sensing elements, the sensing elements being configured to be connected to read-out circuitry for detecting a capacitive coupling between each of the sensing elements and a finger placed on a sensing surface of the sensing device; a cover layer arranged vertically above the sensing elements to cover at least a portions of the sensing elements, wherein an outer surface of the cover layer form the sensing surface of the sensing device; wherein the cover layer comprises a three-dimensional pattern configured to reduce the amount of reflected light within a predetermined sub-range of the visible range. There is also provided a method for manufacturing a fingerprint sensing device.

15 Claims, 6 Drawing Sheets

(56) References Cited

OTHER PUBLICATIONS

Si, G. et al., "Nanoscale—Reflective Plasmonic Color Filters Based on Lithographically Patterned Silver Nanorod Arrays," The Royal Society of Chemistry 2013, vol. 5, No. 14, Jul. 21, 2013, pp. 6243-6248.
Tan, S. et al., "Plasmonic Color Palettes for Photorealistic Printing with Aluminum Nanostructures," American Chemical Society, Nano Letters 2014, vol. 14, pp. 4023-4029.

* cited by examiner

FINGERPRINT SENSING DEVICE COMPRISING THREE-DIMENSIONAL PATTERN

CROSS-REFERENCE TO RELATED APPLICATIONS

This application claims the benefit of Swedish Patent Application No. 1550957-3, filed on Jul. 3, 2015. The disclosure of the above application is incorporated herein by reference in its entirety.

FIELD OF THE INVENTION

The present invention relates to a fingerprint sensing device. In particular, the present invention relates to a surface pattern in a fingerprint sensing device.

BACKGROUND OF THE INVENTION

As the development of biometric devices for identity verification, and in particular of fingerprint sensing devices, has lead to devices which are made smaller, cheaper and more energy efficient, the possible applications for such devices are increasing.

In particular fingerprint sensing has been adopted more and more in, for example, consumer electronic devices, due to small form factor, relatively beneficial cost/performance factor and high user acceptance.

Capacitive fingerprint sensing devices, built based on CMOS technology for providing the fingerprint sensing elements and auxiliary logic circuitry, are increasingly popular as such sensing devices can be made both small and energy efficient while being able to identify a fingerprint with high accuracy. Thereby, capacitive fingerprint sensors are advantageously used for consumer electronics, such as portable computers, tablet computers and mobile phones, e.g. smartphones.

The fingerprint sensor may for example be arranged on the front surface of a handheld device, such as a smartphone or tablet computer, in which case the sensor is often arranged having the sensing surface in the same plane as a cover glass for the display of the device. To make the sensor blend in with, or to distinguish the fingerprint sensor from the cover glass, it may be desirable to select a particular color or pattern of the fingerprint sensor.

However, conventional color layers comprising a pigment are rather thick, sometimes more than 40 μm for achieving the desired color and glossiness. The thickness influences the sensor performance, since it increases the distance between the finger and the sensing chip. Currently known coating solutions using a pigment are also limited when it comes to the possibility of creating patterns comprising different colors since each color requires a separate processing step, and the resolution of the resulting pattern is limited to about 100 μm, depending on the application technology.

Furthermore, color pigments are molecules which only partially reflect the incident light and the color is defined by light absorption of molecules in the paint. Depending on the desired color, a molecule has to be found that has the required properties and fine tuning of colors is rather difficult. Moreover, as the color is depending on material properties, it may change as the pigment ages.

SUMMARY

In view of above-mentioned desirable properties of a fingerprint sensing device, and drawbacks of prior art, it is an object of the present invention to provide a fingerprint sensing device and a method for manufacturing a fingerprint sensing device having a colored surface without the use of pigments.

According to a first aspect of the invention, there is provided a fingerprint sensing device comprising: a sensing chip comprising an array of sensing elements, the sensing elements being configured to be connected to readout circuitry for detecting a capacitive coupling between each of the sensing elements and a finger placed on a sensing surface of the sensing device; a cover layer arranged vertically above the sensing elements to cover at least a portions of the sensing elements, wherein an outer surface of the cover layer form the sensing surface of the sensing device; wherein the cover layer comprises a three-dimensional (3D) pattern configured to reduce the amount of reflected light within a predetermined sub-range of the visible range.

That the cover layer is arranged vertically above the sensing elements does not exclude that there may be additional layers arranged between the cover layer and the sensing elements. That the cover layer comprises a three dimensional pattern means that the pattern comprises individual features which have an extension in three dimensions.

The present invention is based on the realization that a fingerprint sensor can be made which can be tailored to have a desired visual appearance of the surface by using a cover layer comprising a three-dimensional pattern configured to reduce the amount of reflected light within a predetermined sub-range of the visible range, thereby achieving a particular color of the sensing device.

Since fingerprint sensors in general comprise some type of cover layer to physically protect the sensing elements. By achieving the desired effects with respect to visual appearance of the fingerprint sensor using a three dimensional pattern comprised in the cover layer, no additional materials are required which is the case e.g. when using pigments. Furthermore, different colors can be achieved by tailoring the three-dimensional pattern with respect to size, shape of pattern and material composition. Furthermore, a higher resolution can be achieved compared to what is known for currently used methods using pigments.

According to one embodiment of the invention, the three-dimensional pattern may be a plasmonic array. The plasmonic array may further comprise an array of plasmonic nanostructures where the nanostructures are galvanically isolated from each other. In the present context, nanostructures generally refers to structures having at least one dimension, and typically all three dimensions, in the nanometer range. The nanometer range is considered to reach up to and including 1000 nm.

According to one embodiment of the invention, a size, shape and distribution of the nanostructures is selected to form a plasmonic array configured to reduce the amount of reflected light within a predetermined sub-range of the visible range. Plasmonic nanostructures can be pillars, cubes, holes, discs, or particles with any shape. The incident light excites localized surface electron plasma oscillations in the nano-scale structures. The structures have a size basically in the range of the wavelength of visible light. By exciting the localized surface plasmons the incident light is partly absorbed. Since white light consists of a spectrum of different wavelengths the light changes the color if some of the wavelengths are absorbed. Which part of the light is absorbed depends on the size and periodicity of the nanostructures. This enables the possibility to change the color appearance of a sample with nanostructures by changing the size and periodicity of the pattern. Since the plasmonic action depends in individual electrically conductive nanostructures, the nanostructures are galvanically isolated from each other so as to not form a conductive path between adjacent nanostructures.

According to one embodiment of the invention, the three-dimensional pattern may be a reflective diffraction grating in which case the three-dimensional pattern comprises an array of nanostructures acting as a diffraction grating. Due to diffraction of incident light at the nanostructures a difference in the optical path length is caused, that is depending on the angle. Interference maxima for different wavelengths can be observed under different angles, depending on the ratio between wavelength and difference in optical path length.

According to one embodiment of the invention, the cover layer may comprise a plurality of sub-layers. Accordingly, the cover layer must not be a homogeneous layer and the cover layer may thus comprise two or more sublayers to form a stack of sublayers. Furthermore, one or more additional layers or structures may be arranged on top of or below the cover layer. In applications where sublayers or structures are arranged on top of the three-dimensional pattern, such layers must be at least partially transparent for the three-dimensional pattern to have any effect with respect to the visual appearance of the sensor.

In one embodiment of the invention, the three-dimensional pattern may be arranged in a first sub-layer which is covered by a second sub-layer. The three-dimensional pattern may require a protection layer to provide mechanical protection for the small structures constituting the array. The second sub-layer may preferably be transparent to allow light to pass through the second sublayer without absorption. Such a transparent layer may for example be a transparent material coated onto the three-dimensional pattern, or it may be a glass cover plate.

According to one embodiment of the invention, the three-dimensional pattern may be arranged at the sensing surface, and the pattern may advantageously be configured to provide hydrophobic surface properties. In addition to the wavelength reflection properties of the pattern, they may further be configured to provide a surface which repels water, which improves the performance of the fingerprint sensing device by reducing the amount of water adhering to the sensing surface. The structures may either cause a roughness that increases the actual contact line between droplet and substrate surface (Wenzel model) or cause air pockets between the surface and the water droplets that prevents the droplet from touching the surface (Cassie-Baxter model). In both cases the hydrophobicity of a material is increased. To enhance the hydrophobic effect, the structures can be as large as 10 μm.

According to one embodiment of the invention, the three-dimensional pattern may be configured to reduce the amount of reflected light within different predetermined sub-ranges of the visible range for different area portions of the sensing device such that an image is formed on the sensing surface. By changing the size and periodicity of the structure locally, pixels with different individually designed colors can be designed allowing colored patterns or even full color photo-like images with high resolution. Since the structures allow a very high resolution and are difficult to copy, this technology can also be used to create watermarks or other anti-counterfeiting features.

In one embodiment of the invention, the three-dimensional pattern may be configured such that the predetermined sub-range is different for different viewing angles. Depending on the configuration of the three-dimensional pattern, also angle dependencies of the color can be achieved. Thereby holographic effects can be achieved which have a very small feature size and which are difficult to replicate, thereby providing an efficient method of ensuring the authenticity of the fingerprint sensing device.

According to one embodiment of the invention, at least a portion of the cover layer may coated by an optically reflecting material. For example, at least protruding portions of the three-dimensional pattern may be coated by an optically reflecting material. To achieve brighter or more reflective colors a metal can be applied on top of the structure or the structure itself can consist of metal. Such a reflecting metal layer cannot be a conductive sheet, which means it has to consist of isolated metal islands. A reflective layer may also be arranged as a background layer such that light which is not reflected by the three-dimensional pattern can be reflected by the reflecting layer.

According to a second aspect of the invention, there is provided a method for manufacturing a fingerprint sensing device, the method comprising: providing a sensing chip comprising an array of sensing elements, the sensing elements being configured to be connected to readout circuitry for detecting a capacitive coupling between each of the sensing elements and a finger placed on a sensing surface of the sensing device; forming a cover layer arranged vertically above the sensing elements to cover at least a portions of the sensing elements, wherein an outer surface of the cover layer form the sensing surface of the sensing device; and in the cover layer, forming a three-dimensional pattern configured to reduce the amount of reflected light within a predetermined sub-range of the visible range.

In one embodiment of the invention, the step of forming a three-dimensional pattern may advantageously comprise nanoimprint lithography or photolithography. Both photolithography and nanoimprint lithography (NIL) are methods which may be used for large scale production. NIL can be used at a low cost and with a high throughput. NIL is based on replicating a master that has the inverse of the desired nano- or micro-patterns. The master is pressed on a substrate to deform a thermoplastic or UV-curable layer. For large scale applications roll to roll NIL or mold inserts are available. Furthermore, pattern created by NIL can more easily have a high resolution compared to patterns formed by photolithography.

According to one embodiment of the invention, the method may further comprise depositing a reflective coating on protruding portions of the three-dimensional pattern.

Additional advantages, effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of a fingerprint sensing device according to the present invention are mainly discussed with reference to a capacitive fingerprint sensing device. A method for manufacturing a fingerprint sensing device is also discussed.

Figure 1:
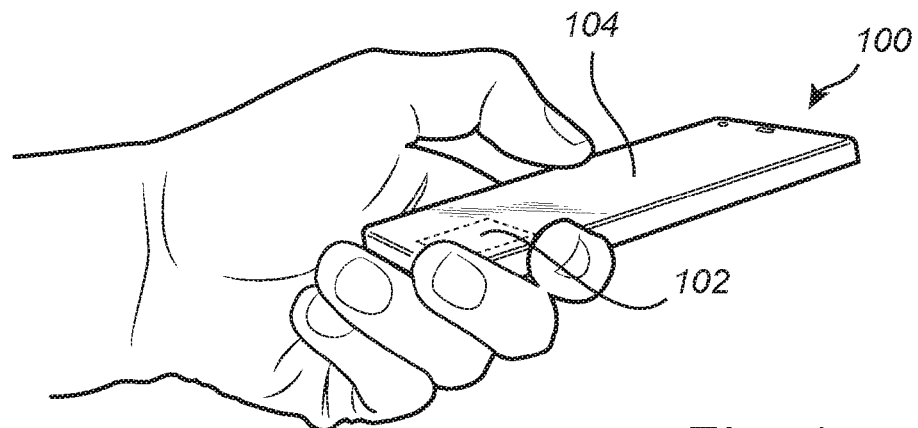
FIG. 1 schematically illustrates a handheld electronic device comprising a fingerprint sensing device according to an embodiment of the invention.

FIG. 1 is a schematic illustration of a handheld device 100 comprising a fingerprint sensing device 102 comprising a touchscreen display 104. A fingerprint sensing device 102 can be used in for example a mobile phone, a tablet computer, a portable computer or any other electronic device requiring a way to identify and/or authenticate a user.

Figure 2A:
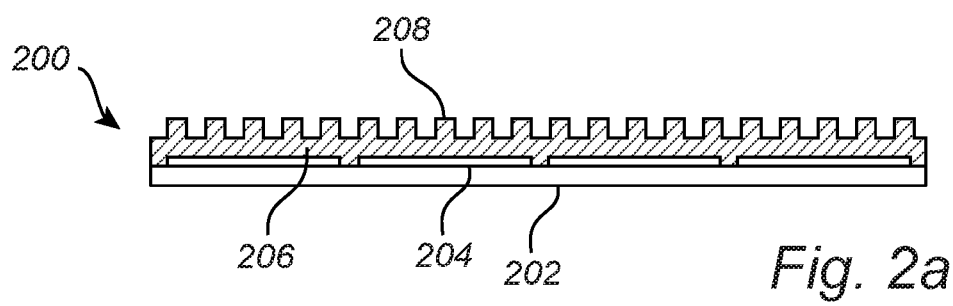
FIGS. 2a-c schematically illustrate a fingerprint sensing device according to an embodiment of the invention.
Figure 2B:
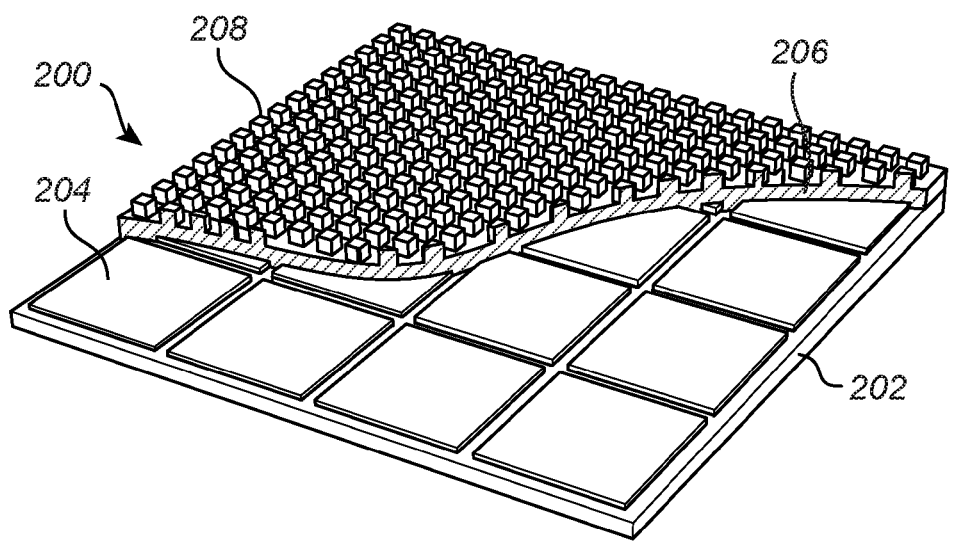

FIGS. 2a-b are schematic illustrations of a fingerprint sensing device 200 according to an embodiment of the invention. It should be noted that the drawings are not made to scale and that they serve to illustrate general concepts of various embodiments of the invention. The exterior surface of the sensing device 200 is referred to as the sensing surface, since that is the surface where a finger will be placed for capturing a fingerprint image. The fingerprint sensing device is based on a sensing chip 202 comprising an array of sensing elements 204. The sensing elements 204 are here shown as square elements arranged in a square array. Typically, the sensing elements have a size of about 50×50 μm and a distance between adjacent elements is about 5 μm. The sensing elements 204 are electrically conductive, typically metallic, and can as a general approximation be considered to act as one plate in a parallel plate capacitor, where a finger placed on a sensing surface of the fingerprint sensing device 200 represents the other plate. Each sensing element 204 is connected to readout circuitry (not shown) for detecting a capacitive coupling between each of said sensing elements 204 and a finger placed on the sensing surface 201 in order to capture a fingerprint image.

The sensing device further comprises a cover layer 206 arranged on top of the sensing elements 204, and the cover layer 206 is typically arranged to cover the entire area of the sensing chip 202. Furthermore, the cover layer comprises a three-dimensional pattern configured to reduce the amount of reflected light within a predetermined sub-range of the visible range, such that the visual appearance of the sensing device 200 can be tailored to exhibit a selected color. The three-dimensional pattern comprises a plurality of nanostructures 208 arranged in an array. The three-dimensional pattern may be either of plasmonic array or a reflective diffraction grating. In the case of a plasmonic array, the nanostructures may be electrically conductive, typically metallic, or the may be made from a dielectric material. In case of electrically conductive nanostructures 208, the nanostructures are preferably not in electrical contact with each other, i.e. they are galvanically isolated from each other, in order to not disturb the capacitive sensing mechanism of the fingerprint sensing device. However, parts of the overall ensemble of nanostructures may be electrically connected, as long as the resulting connected portions do not disturb the operation of the sensing elements. Typically, such connected portions cannot be larger than the sensing elements or be arranged to overlap multiple sensing elements. For example, when the nanostructures are provided in the form of an array of holes in a conductive layer, the conductive layer is interrupted on a larger scale, for example in alignment with the sensing elements.

Figure 2C:
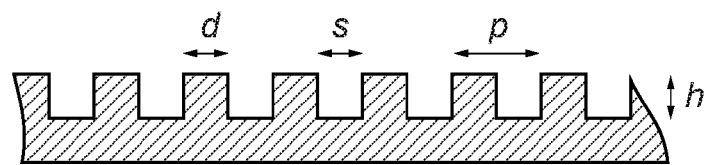

FIG. 2c outline some of the parameters determining the properties of the three-dimensional pattern, and of the nanostructures 208, determining the reflection properties of the pattern, where d represents the width or diameter of a nanostructure 208, s is the distance (spacing) between adjacent nanostructures 208, p is the pitch, and h is the height of the nanostructure 208. Even though the pattern is here illustrated as a regular square array comprising square nanostructures, different configurations of the pattern are possible and the nanostructure may have different shapes, such as cylindrical, pyramid-shaped, conical, or a truncated cone or pyramid. The nanostructures may also be pillars, cubes, holes, discs, or particles with an arbitrary shape. In embodiments where the three-dimensional pattern is a reflecting diffraction grating, the nanostructures may be elongated as will be illustrated below.

As an example the nanostructures 208 for a plasmonic array may have a height of about 150 nm, a diameter of about 200 nm, a spacing of about 300 nm with a periodicity of about 500 nm. It should be noted that various embodiments of the present invention are by no means limited to structures according to the above, and that the given example merely describe the order of magnitude of the size of the nanostructures. Specific example on how to form nanostructure arrays for reflecting different wavelengths can for example be found in Gu et al, Nanoscale, 2015, 7, 6409.

For a diffraction grating, the sizes are about the same as above, but other shapes are possible.

Figure 3A:
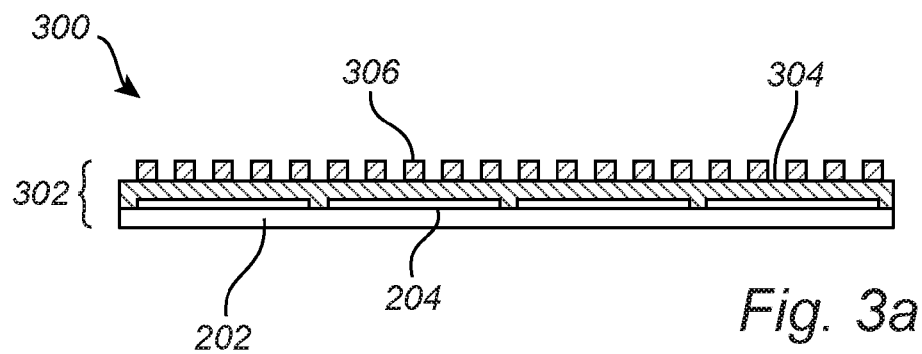
FIGS. 3a-f schematically illustrate fingerprint sensing devices according to embodiments of the invention.

FIG. 3a is a schematic illustration of a fingerprint sensing device 300 where the cover layer 302 comprises two separate sublayers. A first sublayer 304 is arranged to cover the sensing elements 204. The first sublayer 304 may for example be a mold layer used to protect the sensing elements 204 and to form an even surface on which the three-dimensional pattern can be formed. The second sublayer comprises a plurality of nanostructures 306 forming the three-dimensional pattern.

Figure 3B:
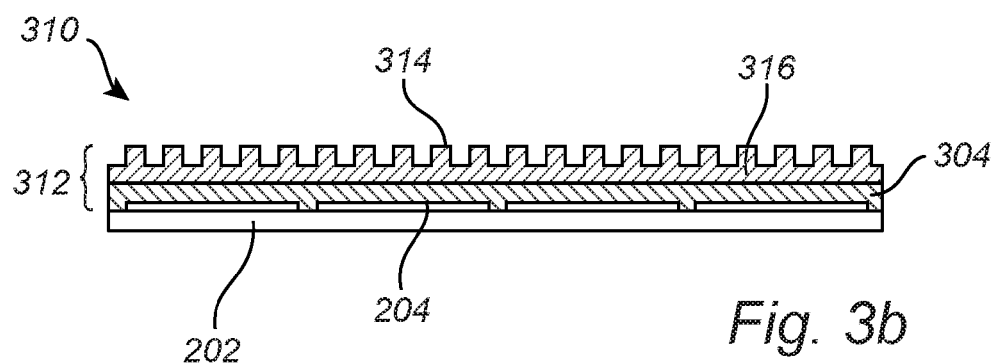

FIG. 3b is a schematic illustration of a fingerprint sensing device 310 where the cover layer 312 comprises two separate sublayers, similar to as shown in FIG. 3a. However, in FIG. 3b, the nanostructures 314 are only formed in a portion of the second sublayer 316.

Figure 3C:
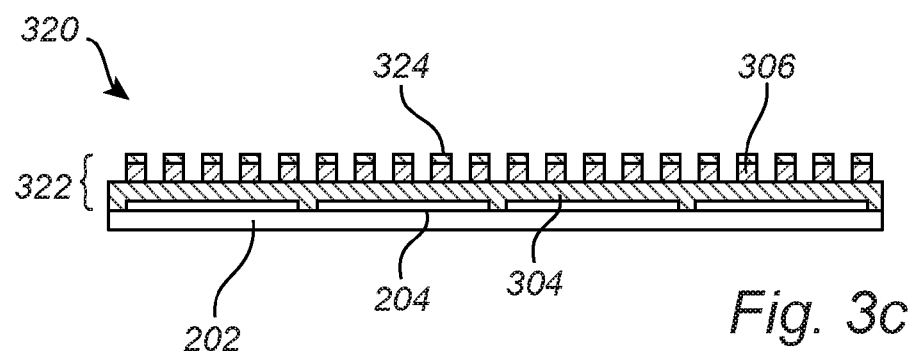

FIG. 3c is a schematic illustration of a fingerprint sensing device 320 where the cover layer 322 can be said to comprise three sublayers, 304, 306 and 324, where the top surface of the nanostructures 306 are coated by a reflective material 324 to enhance the reflecting properties of the pattern in order to as efficiently as possible reflect the wavelengths which are not absorbed by the three-dimensional pattern. The reflective material 324 can for example be a metal.

Figure 3D:
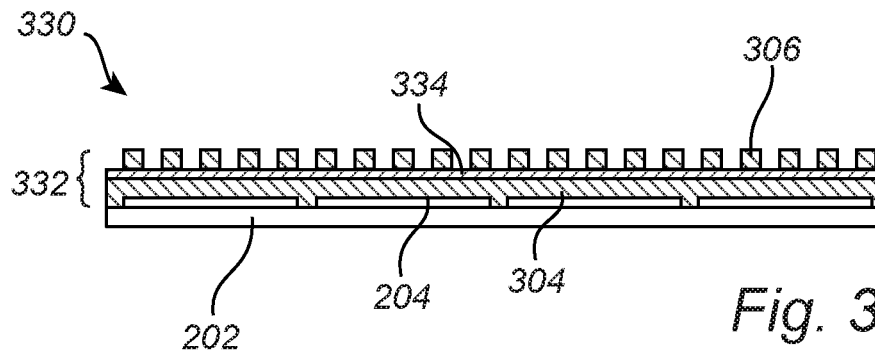

FIG. 3d is a schematic illustration of a fingerprint sensing device 330 where the cover layer 332 comprises a first sublayer 304 protecting the sensing elements, a second sublayer 334 comprising a reflective material, and a third sublayer comprising nanostructures 306 forming a three-dimensional pattern. In the case of a reflective material layer 334 covering substantially the entire surface of the sensing chip 202, the reflective material cannot be electrically conductive as discussed above.

In the embodiments described above where the three dimensional pattern forms the outer surface of the fingerprint sensing device, the pattern may advantageously be configured to also provide hydrophobic or super-hydrophobic surface properties.

Figure 3E:
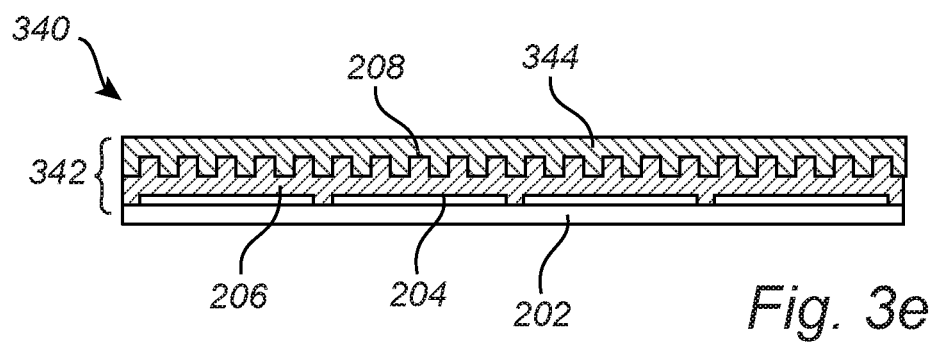

FIG. 3e schematically illustrates a fingerprint sensing device 340 where the cover layer 342 comprises an additional sublayer 344 arranged to cover nanostructures 208 forming the three dimensional pattern. The additional layer 344 may for example be a mold layer arranged to protect the nanostructures 208.

Figure 3F:
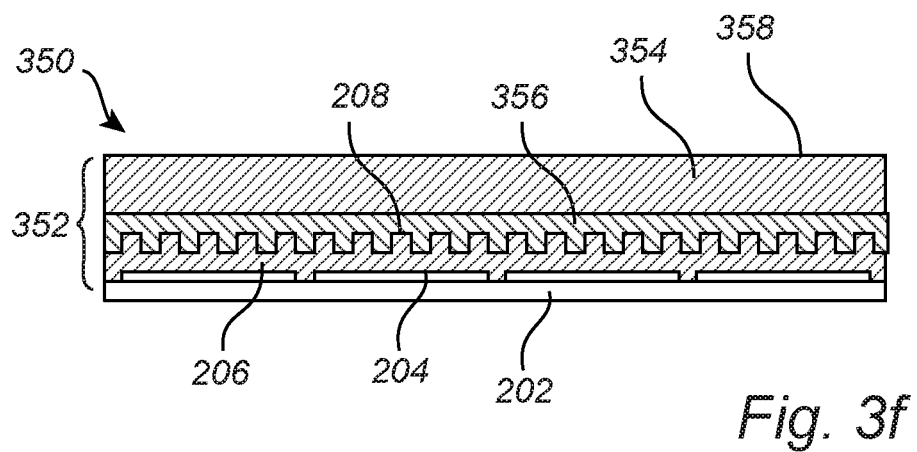

FIG. 3f schematically illustrates a fingerprint sensing device 350 where the cover layer 352 comprises a sublayer in the form of a protective plate 354 arranged to cover the three-dimensional pattern and to form an exterior surface 358, i.e. a sensing surface, of the fingerprint sensing device 350. The protective plate typically comprises a dielectric material in order to provide a good capacitive coupling between a finger placed on the plate and the sensing elements of the sensing chip. In particular, the protective plate may advantageously comprise a glass or ceramic material, such as a chemically strengthened glass, ZrO2 or sapphire. The aforementioned materials all provide advantageous properties in that they are hard and thereby resistant to wear and tear, and in that they are dielectric thereby providing a good capacitive coupling between a finger placed on the surface of the protective plate and the sensing element of the sensing device. The protective plate 354 can be attached to the sensing device using an adhesive 356 arranged between the pattern and the plate 354. The adhesive 356 can thus fill the spaces between the nanostructures so that no air is trapped in the device.

In the embodiments described with reference to FIGS. 3e-f, the material covering the three-dimensional pattern is at least partially transparent to visible light so that light can reach the pattern.

Based on the embodiments described in FIG. 3a-f, the skilled person readily realizes that the embodiments may be combined in many different ways leading to configurations of sensing devices not explicitly described herein. It should thus be understood that the present inventive concept is equally applicable to a large number of possible configurations of a fingerprint sensing device.

Figure 4A:
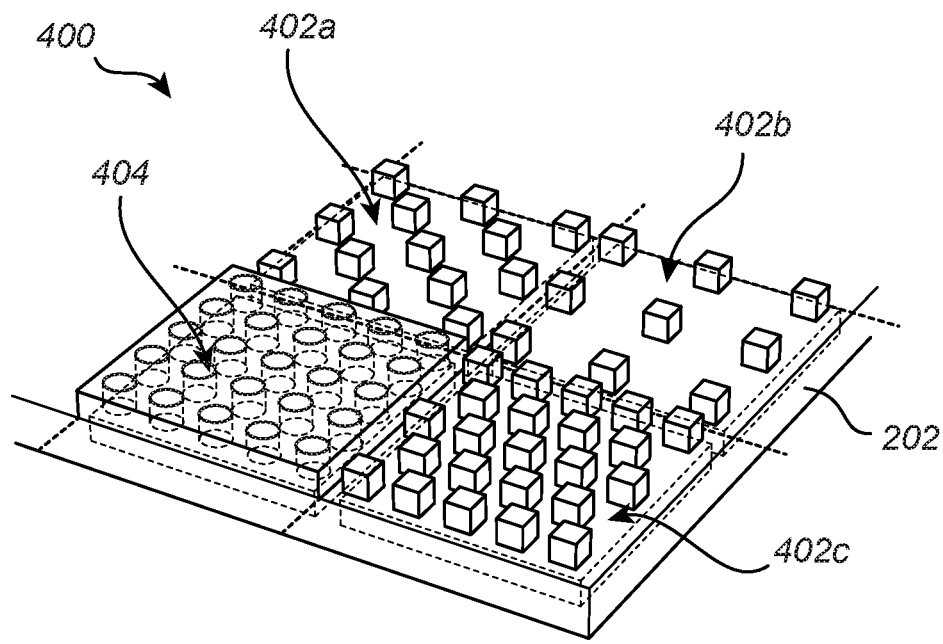
FIGS. 4a-b schematically illustrate fingerprint sensing devices according to an embodiment of the invention.

FIG. 4a is a schematic illustration of a fingerprint sensing device 400 according to an embodiment of the invention where different area portions 402a-c of the device 400 have different configurations of the three-dimensional pattern. Each area portion may be referred to as a sub-array or a color pixel 402a-c, which is not to be confused with the sensing element. Each color pixel can have a three-dimensional pattern configured to reduce the amount of reflected light within a specific predetermined sub-range of visible light. The pattern and/or the nanostructures may be varied in any of the ways discussed above so that each color pixel displays the desired color. Furthermore, the color pixels of the three dimensional pattern can have a size which is considerably smaller than the sensing element, thereby providing the possibility to form high resolution images on the surface of the sensing device 400. For example, the color pixel may have a size in the range of 500 nm×500 nm.

Figure 4B:
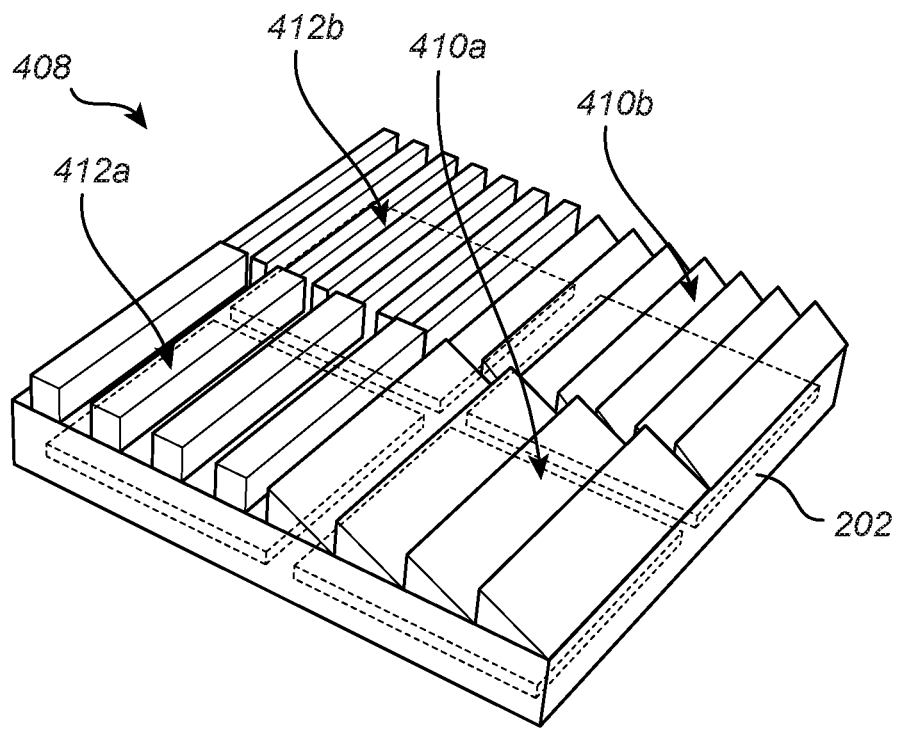

FIG. 4b schematically illustrates a sensing device where different area portions of the device 408 comprises different types of diffraction gratings as illustrated by the saw-tooth patterns 410a-b and by the elongated ridges 412a-b, where the dimensions of the respective patterns are different to illustrate that each area portion can be tailored to reflect a desired wavelength spectrum. Accordingly, for a diffraction grating different shapes of the nanostructures can be used in comparison to in plasmonic array.

The illustrated color pixels also provides the possibility to combine plasmonic arrays with diffractive gratings in the same plane, where the technique used to achieve the desired color for each particular color pixel can be selected based on which technique provides the better result for the specific color. As an alternative configuration, it would also be possible to provide to stacked layers where a first layer comprises a plasmonic array and where a second layer comprises a diffractive grating.

A detailed example on how to form plasmonic arrays having different wavelength reflecting properties can for example be found in "*Reflective plasmonic color filters based on lithographically patterned silver nanorod arrays*", Si et. al, Nanoscale, 2013, 5, 6243.

Figure 5:
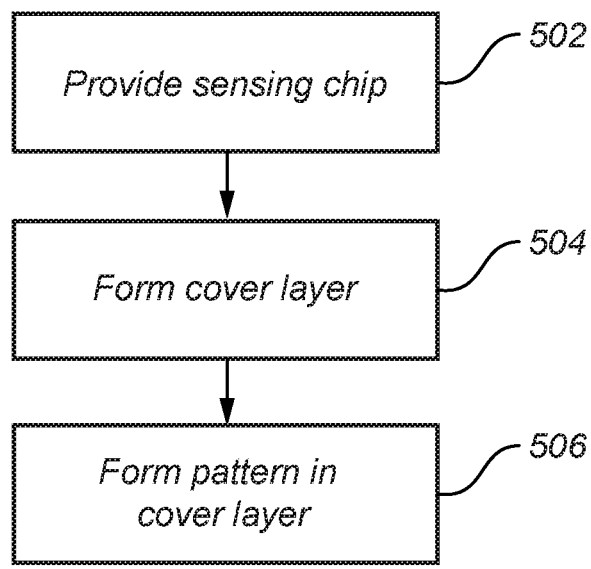
FIG. 5 is a flow chart outlining the general steps of a method according to an embodiment of the invention.
Figure 6A:
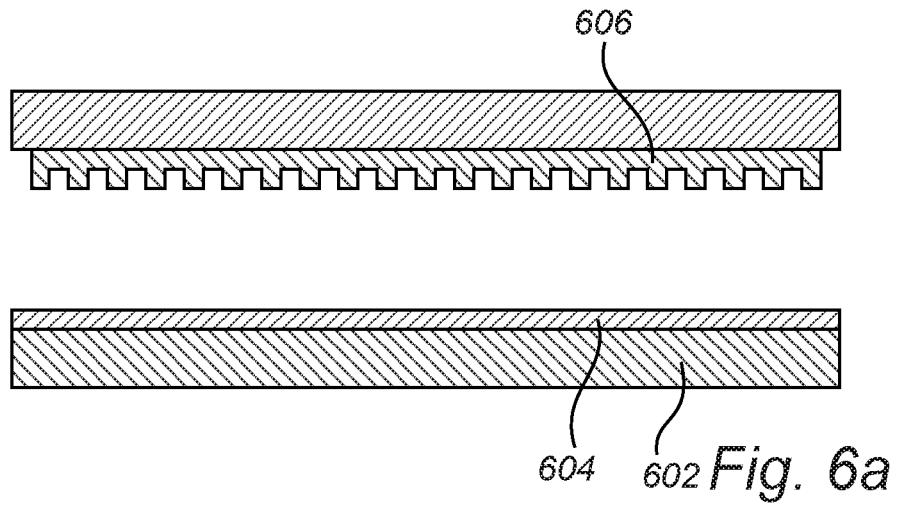
FIGS. 6a-c schematically illustrates a method of manufacturing a fingerprint sensing device according to an embodiment of the invention.
Figure 6B:
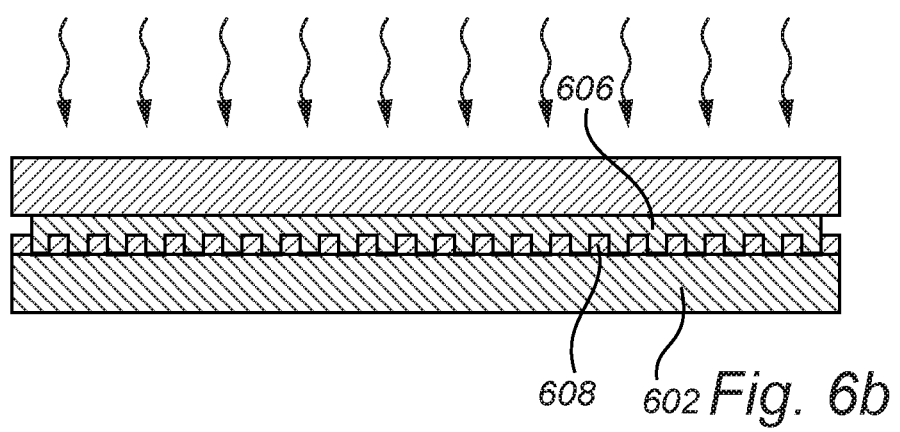
Figure 6C:
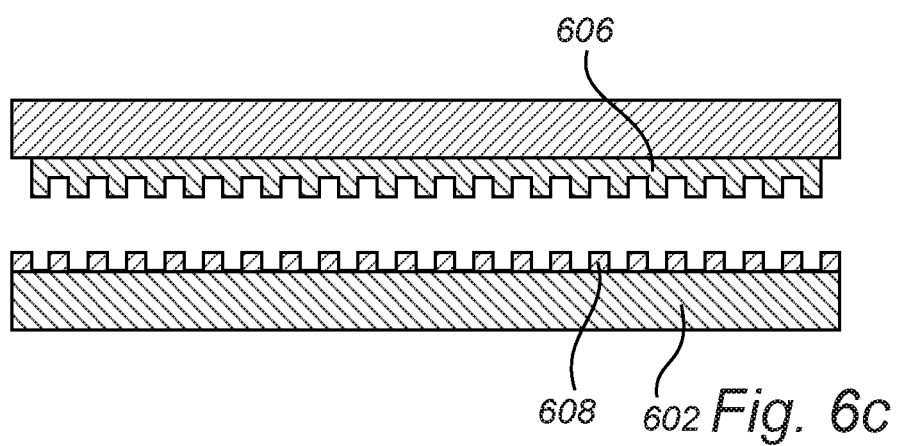

FIG. 5 is a flow chart outlining the general steps of a method according to an embodiment of the invention, and FIGS. 6a-c are schematic illustrations outlining manufacturing steps according to an embodiment of the invention. The method will be described with reference to FIGS. 6a-c illustrating a nanoimprint lithography method for forming a three-dimensional pattern in a fingerprint sensing device.

First 502, a sensing chip 602 comprising sensing elements (not shown) is provided and the sensing chip is subsequently coated 504 with a cover layer 604 in which the pattern is to be formed. The cover layer can for example be a thermoplastic polymer resist. An imprint mold 606 is provided comprising a reversed/mirrored version of the pattern to be formed in the cover layer 604.

Next, the imprint mold 606 is being pressed onto the cover layer 604 while the cover layer 604 is being heated above the glass transition temperature so that the cover layer 604 becomes soft and deformable. Thereby, the pattern 608 is formed 506 in the cover layer 604.

Finally, the sensing chip 602 and the imprint mold 606 is cooled so that the cover layer solidifies, leaving the sensing device with a three-dimensional pattern covering the sensing elements.

The cover layer may also comprise a UV-curable material in which case the layer is illuminated by UV light to harden after the imprint mold has been pressed into the cover layer.

Any additional layers described above with reference to FIGS. 3a-f can be formed using conventional and known manufacturing methods.

Even though the invention has been described with reference to specific exemplifying embodiments thereof, many different alterations, modifications and the like will become apparent for those skilled in the art. Also, it should be noted that parts of the device and method may be omitted, interchanged or arranged in various ways, the device and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A fingerprint sensing device comprising:
a sensing chip comprising an array of sensing elements, said sensing elements being configured to be connected to readout circuitry for detecting a capacitive coupling between each of said sensing elements and a finger placed on a sensing surface of said sensing device;
a cover layer arranged vertically above said sensing elements to cover at least a portions of said sensing elements, wherein an outer surface of said cover layer form said sensing surface of said sensing device;
wherein said cover layer comprises a three-dimensional pattern configured to reduce an amount of reflected light within a predetermined sub-range of a visible range.

2. The sensing device according to claim 1, wherein said three-dimensional pattern is a plasmonic array comprising a plurality of electrically conductive nanostructures, wherein said nanostructures are galvanically isolated from each other.

3. The sensing device according to claim 2, wherein a size, shape and distribution of said nanostructures is selected to form a plasmonic array configured to reduce the amount of reflected light within a predetermined sub-range of the visible range.

4. The sensing device according to claim 1, wherein said three-dimensional pattern is reflective diffraction grating.

5. The sensing device according to claim 1, wherein said cover layer comprises a plurality of sub-layers.

6. The sensing device according to claim 5, wherein said three-dimensional pattern is arranged in a first sub-layer which is covered by a second sub-layer.

7. The sensing device according to claim 1, wherein said cover layer comprises a first area portion where said three-dimensional pattern is configured to reduce a first amount of reflected light within a first predetermined sub-range, and a second area portion where said three-dimensional pattern is configured to reduce a second amount of reflected light within a second predetermined sub-range, wherein said first predetermined sub-range is different from said second predetermined sub-range.

8. The sensing device according to claim 1, wherein said three-dimensional pattern is arranged at said sensing surface, and wherein said pattern is configured to provide hydrophobic surface properties.

9. The sensing device according to claim 1, wherein said three-dimensional pattern is configured to reduce the amount of reflected light within different predetermined sub-ranges of the visible range for different area portions of the sensing device such that an image is formed on said sensing surface.

10. The sensing device according to claim 1, wherein said three-dimensional pattern is configured such that the predetermined sub-range is different for different viewing angles.

11. The sensing device according to claim 1, wherein at least a portion of said cover layer is coated by an optically reflecting material.

12. The sensing device according to claim 1, wherein at least protruding portions of said three-dimensional pattern are coated by an optically reflecting material.

13. A method for manufacturing a fingerprint sensing device, said method comprising:
providing a sensing chip comprising an array of sensing elements, said sensing elements being configured to be connected to readout circuitry for detecting a capacitive coupling between each of said sensing elements and a finger placed on a sensing surface of said sensing device;
forming a cover layer arranged vertically above said sensing elements to cover at least a portions of said sensing elements, wherein an outer surface of said cover layer form said sensing surface of said sensing device; and
in said cover layer, forming a three-dimensional pattern configured to reduce an amount of reflected light within a predetermined sub-range of a visible range.

14. The method according to claim 13, wherein forming the three-dimensional pattern comprises nanoimprint lithography or photolithography.

15. The method according to claim 13, further comprising depositing a reflective coating on protruding portions of said three-dimensional pattern.

* * * * *